(12) United States Patent
Blackmore et al.

(10) Patent No.: US 6,296,921 B1
(45) Date of Patent: *Oct. 2, 2001

(54) COMPOSITE FABRIC

(75) Inventors: Phillip W. Blackmore, Fenwick (CA); David L. Spanton, Albion; Douglas W. LeVan, Medina, both of NY (US)

(73) Assignees: Bay Mills Ltd, Ontario (CA); CertainTeed Corp, Valley Forge, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,189

(22) Filed: Dec. 22, 1998

(51) Int. Cl.[7] .................. B32B 3/06; B32B 5/12; B32B 5/02; B32B 5/26
(52) U.S. Cl. .................. 428/102; 428/105; 428/114; 442/60; 442/381
(58) Field of Search .................. 428/295, 325, 428/215, 291, 105, 299.4, 298.1, 300.7, 119, 102, 223; 442/268, 277, 282, 225, 226, 367; 66/190, 191; 112/420, 429

(56) References Cited

U.S. PATENT DOCUMENTS

| 4,511,619 | 4/1985 | Kuhnel et al. ............... 428/215 |
|---|---|---|
| 5,108,831 | * 4/1992 | Green ........................... 428/291 |
| 5,151,146 | * 9/1992 | Green ........................... 156/177 |
| 5,296,278 | * 3/1994 | Nishimura et al. .......... 428/36.1 |
| 5,474,838 | 12/1995 | Calloway et al. . |
| 5,569,430 | 10/1996 | Callaway et al. . |
| 5,766,724 | * 6/1998 | Tailor et al. .................. 428/110 |

* cited by examiner

*Primary Examiner*—Blaine Copenheaver
*Assistant Examiner*—Christopher C. Pratt
(74) *Attorney, Agent, or Firm*—Duane Morris & Heckscher LLP

(57) ABSTRACT

A lightweight, high-strength composite fabric suitable for use in carpet backing, roofing and membranes and other products which employ rugged fabrics. The composite fabric comprises a layer of nonwoven material disposed between a layer of low shrinkage warp strands and a layer of low shrinkage weft strands. The layers are stitched or knitted together and the resultant fabric may be coated with a resin or sizing to prevent slippage between the several layers of the fabric and impart a measure of stiffness to the fabric. The fabric may be manufactured in sheet or, more preferably, roll form and may be coated with materials suitable for desired end applications, e.g., bituminous material whereby the fabric may function as a ready-to-use roofing membrane or other high-strength fabric product.

9 Claims, 2 Drawing Sheets

COMPOSITE FABRIC

FIELD OF THE INVENTION

The present invention relates in general to fabrics and in particular to lightweight, high-strength composite fabrics suitable for use as carpet backing, roofing membranes and other products which employ rugged fabrics.

BACKGROUND OF THE INVENTION

Carpet backing, roofing membranes and other products commonly require the use of flexible, yet tough and durable fabrics. In the past, such fabrics have typically been made of woven and nonwoven natural artificial fabrics such as hemp, jute, nylon, polyester, and the like. When used as carpet backing, the fabrics are commonly coated with latex or similar material, and when used as roofing membranes the fabrics may be coated with bituminous material.

Some of these fabrics may assume composite constructions. For instance, many roofing membranes include a layer of woven material and a layer of nonwoven material. The woven material typically provides strength and durability. The nonwoven material prevents bitumen bleed-through in roofing membranes and adhesive from falling through the carpet backing during carpet manufacture. Some manufacturers glue the nonwoven material to the woven material. However, adhesive bond failure occurs in a high percentage of such products. Others have overcome this problem by stitching or knitting the nonwoven material to the woven material.

U.S. Pat. Nos. 5,474,838 and 5,569,430, for example, describe roofing membranes, including reinforcement material consisting of a fiberglass scrim fabric to which is stitched or knitted a layer of nonwoven thermoplastic staple fibers formed from polyester and/or nylon. The nonwoven material is stitched or knitted to the fiberglass scrim on a Malimo or weft insertion machine with stitch through capability. The composite fabric is then saturated with bituminous material to produce the final roofing membrane product. A composite reinforcement material so constructed results in a structurally "imbalanced" fabric. The shortcomings of such a construction become increasingly pronounced as the weight of the nonwoven material increases and the reinforcement is exposed to elevated temperatures, e.g., when the reinforcement is saturated with hot bituminous material in the final stage of the roofing membrane manufacturing process.

Additionally, when the saturated roofing membrane is installed on a roof, the roof may be covered with a hot bituminous tack coat prior to placement of the membrane. Once the membrane is placed, heat and/or a second coating of hot bituminous material may be applied to the upper surface of the membrane. If the nonwoven material in the composite fabric is sufficiently heavy in weight and exposed to sufficiently hot bitumen, however, the thermoplastic nonwoven material may shrink somewhat, whereas the fiberglass scrim remains essentially constant in size. The differential shrinkage of the nonwoven material relative to the scrim may cause the membrane to curl or otherwise deform in either or both of the warp and weft directions of the membrane. As a consequence, roofing membranes constructed according to those described in U.S. Pat. Nos. 5,474,838 and 5,569,430 may produce a less than desirable aesthetic effect when applied to a roof surface. Even more significantly, they may not uniformly adhere to the roof thereby creating gaps which may permit possible ingress of water, dirt, pollutants and other atmospherically-borne matter that may be harmful to the roof structure.

An advantage exists, therefore, for a composite fabric suitable for roofing membranes, carpet backing and other applications which is lightweight, high-strength, balanced in construction and resistant to deformation when exposed to elevated temperatures.

SUMMARY OF THE INVENTION

The present invention provides a lightweight, high-strength composite fabric suitable for use in carpet backing, roofing and membranes and other products which employ rugged fabrics. The composite fabric comprises a layer of nonwoven material disposed between a layer of low shrinkage warp strands and a layer of low shrinkage weft strands. The layers are stitched or knitted together and the resultant fabric may be coated with a resin or sizing to prevent slippage between the several layers of the fabric and impart a measure of stiffness to the fabric. According to presently preferred embodiments, the warp and weft layers are glass fiber strands and the nonwoven material may include natural and/or artificial fibrous materials such as glass or thermoplastic fiber filaments, rayon, cotton, linen (flax), ramie, paper, wood pulp or blends thereof.

The fabric may be manufactured in sheet or, more preferably, roll form and may be coated with materials suitable for desired end applications, e.g., bituminous material, whereby the fabric may function as a ready-to-use roofing membrane or other high-strength fabric product.

Other details, objects and advantages of the present invention will become apparent as the following description of the presently preferred embodiments and preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
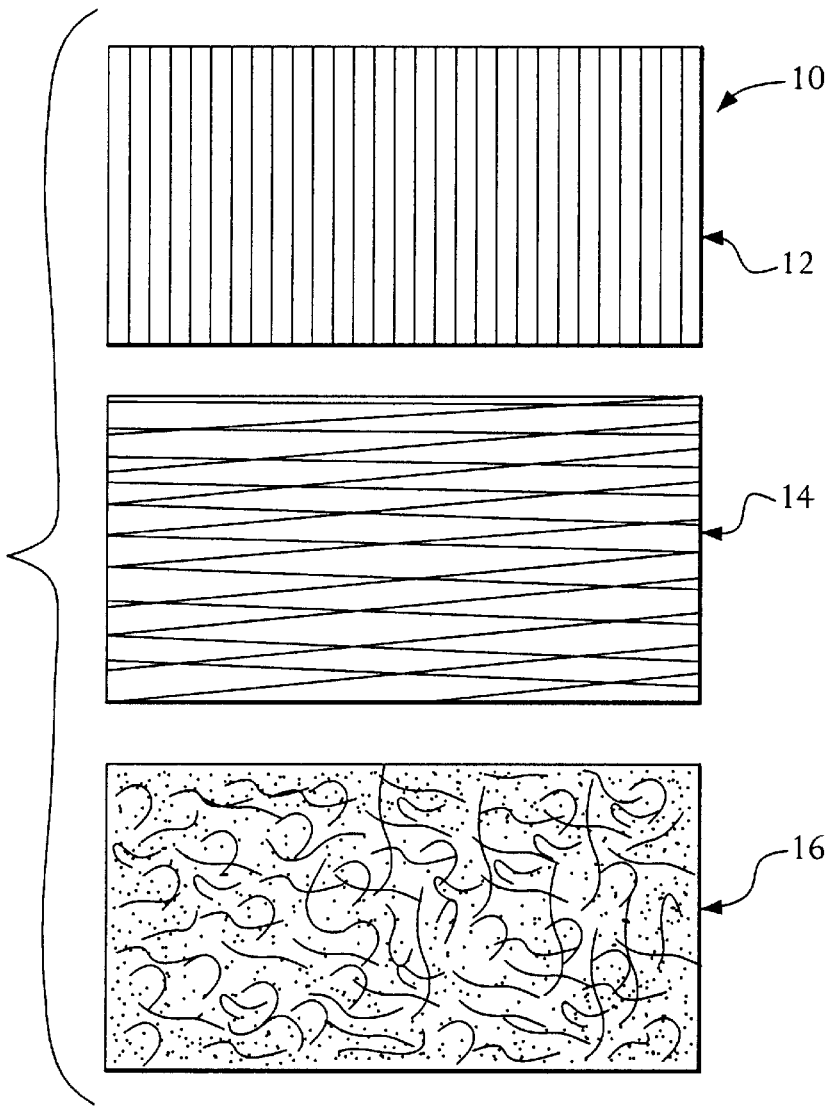
FIG. 1 is an exploded view of a composite fabric known in the art.

Referring initially to FIG. 1, there is shown a composite fabric of conventional construction. The fabric, identified by reference numeral 10, is generally illustrative of composite fabric manufactured by Milliken Research Corporation of Spartanburg, S.C. Fabric 10 comprises fiberglass scrim including a first layer 12 of substantially parallel warp (or machine direction) strands of glass fibers, a second layer 14 of weft (or cross-machine direction) strands of glass extending substantially perpendicular to the strands of the first layer 12. Fabric 10 further includes a third layer 16 of nonwoven material formed from polyester staple fibers. The nonwoven layer 16 is stitched by unillustrated stitch yarn to the surface of the second layer 14 that is opposite the first layer 12. It is believed that the fabric 10 is representative of the roofing membrane reinforcing fabric disclosed in U.S. Pat. Nos. 5,474,838 and 5,569,430 discussed above.

Figure 2:
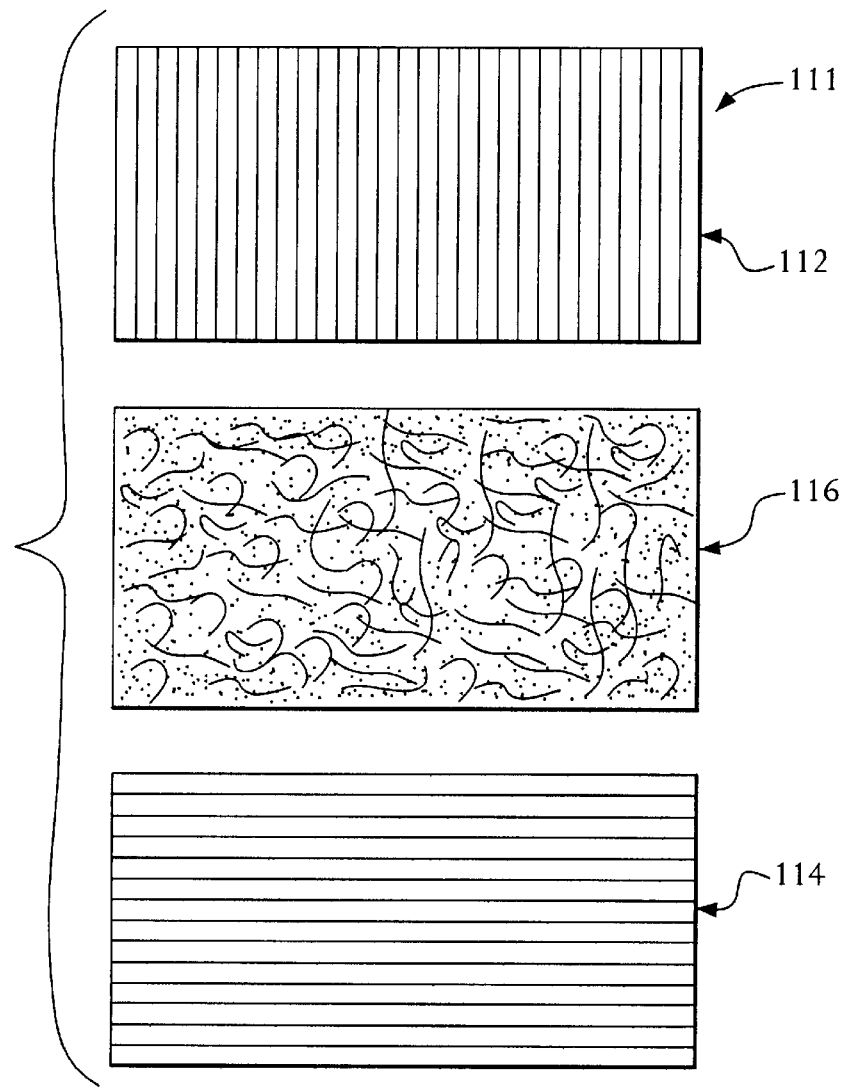
FIG. 2 is an exploded view of a composite fabric constructed in accordance with the present invention.
Figure 3:
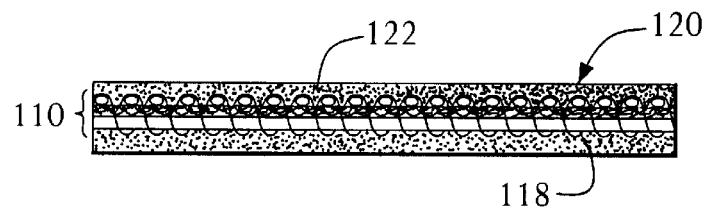
FIG. 3 is an elevational cross-section view of a roofing membrane incorporating the composite fabric of FIG. 2.

FIGS. 2 and 3 respectively depict presently preferred embodiments of a composite fabric and a roofing membrane incorporating such fabric in accordance with the present invention. The fabric, identified generally by reference numeral 110 in FIG. 2 comprises a first layer 112 of substantially parallel warp strands, a second layer 114 of weft strands and a third layer 116 of nonwoven material disposed between the first and second layers 112 and 114. The second layer 114 may be arranged as substantially parallel strands or somewhat acutely angled strands (with respect to the warp strands of first layer 12) similar to the weft strands depicted, for example, by second layer 14 of fabric 10 in FIG. 1.

The strands of first and second layers 112, 114 are preferably fabricated from yarns or rovings of low shrinkage, and preferably high modulus of elasticity, fibrous materials which maintain their dimensional stability and integrity when exposed to a broad range of temperatures. Examples include, without limitation, polyamide fibers of poly (p-phenylene terephthalamide) known as Kevlar®, o-phenylene terephthalamide known as Nomex®, ultra low shrink polyester, nylon, fiberglass and blends thereof. Presently preferred materials suitable for use as the strands of the first and second layers 112, 114 are about 150 s (15000 yds/lb) to about 18 s (1800 yds/lb) glass yarns or about 68 tex to about 735 tex glass rovings.

Presently preferred materials suitable for use as nonwoven layer 116 include, without limitation, staple or continuous strand fibers of glass, polyester, nylon, rayon, cotton, flax, ramie, paper, wood pulp, and blends thereof. For instance, suitable nonwoven layers 116 may include papers such as tissue papers, carded webs (including carded chemical bonded and carded thermal bonded), spun bonds, wet laid webs and air laid webs of polyester and/or nylon staple fibers of about 0.5 to about 1.5 oz/yd$^2$ or a glass mat of about 0.7 to about 2.3 lb/100 ft$^2$, rayon, cotton, linen (flax), ramie, wood pulp and blends thereof. The purpose of the nonwoven layer 116 is to assist the fabric 110 in retaining coating materials that may be subsequently applied to the fabric following formation thereof, e.g., the bituminous material described here below in connection with the discussion of FIG. 3.

Fabric 110 may be constructed by any suitable method or apparatus capable of assembling layers 112, 114 and 116 in the desired order. A presently preferred apparatus suitable for assembling fabric 110 is a Liba warp knitting machine. In the machine the warp layer 112 is formed and held straight under tension, the nonwoven layer 116 is inserted under the warp layer and the weft layer 114 is then introduced beneath the nonwoven layer. The fabric assembly is held in place by unillustrated retainer clips and thereafter stitched together by stitch yarn 118 (FIG. 3). The stitching may assume any manner of conventional stitch or knit pattern. The stitch yarn 118 may be any suitable natural and/or synthetic yarn or thread capable of reliably securing the several layers of the fabric 110 to one another. A presently preferred stitch yarn is about 40 to about 250 denier, more preferably about 150 denier, polyester, nylon, polyester/nylon blend or any conventional lightweight, high-strength synthetic yarn.

Following assembly, fabric 110 is desirably provided with a light coating of resin, sizing or other material capable of imparting slight to moderate stiffness to the fabric. The agent "locks" the positions, i.e., prevents sliding, of layers 112, 114, 116 relative to one another, facilitates formation and storage of the fabric in roll form and enhances handleability of the fabric.

With the nonwoven layer 116 disposed between the first and second shrink-resistant warp and weft layers 112 and 114 rather than to one side or the other of the scrim, the fabric 110 is a structurally balanced composite fabric. Thus, it is resistant to curling, warping or other deformation in virtually any application and temperature range in which the fabric may be expected to be placed into use, regardless of the weight of the nonwoven layer 116. An example of such an application is shown in FIG. 3. In that figure it is seen that a fabric reinforcement product 120 comprises fabric 110 which is embedded within a natural or synthetic polymer coating or saturant material 122 that is suitable for use in roofing or carpet backing applications, among others. Such polymer materials may include, without limitation, bitumens, modified bitumens, polyvinyl chloride, polyvinyl chloride plastisol, ethylene-propylene diene monomer, chlorsulfonated polyethylene, polyisobutylene and chlorinated polyethylene.

In the manufacture of product 120, the composite reinforcing fabric 110 may be saturated by bituminous material, for example, to produce a roofing membrane. To do so, the fabric may be conveyed through a tank of bituminous material heated to about 275° to about 425° F. (135° to 220° C.) using methods which are known in the art. The fabric 110 may also be used with cold mastics such that the fabric 110 will not come into contact with hot coatings either in the fabric coating process or during installation of the roofing membrane 120 on a roof. Product 120 may be formed and stored in roll form and may be applied to a roof using additional bituminous material and/or a heat source to bond and seal the membrane to the roof and adjacent similar membranes.

Following assembly, it is contemplated that fabric 110 may be saturated with other substantially fluid impervious materials in order to produce fabric-reinforced products such as, for example, roofing membranes and carpet backing. Other such saturating materials may include, without limitation, polyvinyl chlorides (PVCs), PVC plastisol, ethylene-propylene diene monomer (EPDM), chlorosulfonated polyethylene, polyisobutylene and chlorinated polyethylene.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A fabric reinforced product comprising a composite fabric embedded within a polymer material, said composite fabric comprising a structure consisting of a single layer of warp strands, a single layer of weft strands, and a single layer of nonwoven material disposed between said layers of warp strands and weft strands, the layers of warp and weft strands and the nonwoven material being stitched or knitted together.

2. The product of claim 1 wherein said warp strands and said weft strands are fabricated from low shrinkage materials.

3. The product of claim 2 wherein said low shrinkage materials are selected from the group consisting of polyamide fibers of poly (p-phenylene terephthalate), o-phenylene terephthalamide, ultra low shrink polyester, fiberglass or blends thereof.

4. The product of claim 1 wherein said nonwoven material is manufactured from staple or continuous strand fibers selected from the group consisting of glass, polyester, nylon, rayon, cotton, flax, ramie, paper, wood pulp and blends thereof.

5. The product of claim 1 wherein said polymer material is selected from the group consisting of bitumens, modified bitumens, polyvinyl chloride, polyvinyl chloride plastisol, ethylene-propylene diene monomer, chlorosulfonated polyethylene, polyisobutylene and chlorinated polyethylene.

6. The product of claim 1, wherein the polymer material is a resin or sizing, which locks positions of the layers and prevents sliding of the layers relative to each other.

7. The product of claim 1, wherein the polymer material is a resin or sizing, which locks positions of the layers and prevents sliding of the layers relative to each other.

8. A fabric reinforced roofing membrane comprising a composite fabric embedded within a polymer material, said composite fabric comprising a structure consisting of a single layer of warp strands, a single layer of weft strands, and a single layer of nonwoven material disposed between said layers of warp strands and weft strands, the layers of warp and weft strands and the nonwoven material being stitched or knitted together.

9. A fabric reinforced carpet backing comprising a composite fabric embedded within a polymer material, said composite fabric comprising a structure consisting of a single layer of warp strands, a single layer of weft strands, and a single layer of nonwoven material disposed between said layers of warp strands and weft strands, the layers of warp and weft strands and the nonwoven material being stitched or knitted together.

* * * * *